(12) United States Patent
Wang

(10) Patent No.: US 8,004,967 B2
(45) Date of Patent: Aug. 23, 2011

(54) RING NETWORK ROUTING METHOD AND RING NETWORK NODE

(75) Inventor: Ju Wang, Beijing (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 215 days.

(21) Appl. No.: 12/435,305

(22) Filed: May 4, 2009

(65) Prior Publication Data

US 2009/0290486 A1 Nov. 26, 2009

(30) Foreign Application Priority Data

May 20, 2008 (CN) .......................... 2008 1 0111983

(51) Int. Cl.
*H04L 12/28* (2006.01)
*G01R 31/08* (2006.01)
(52) U.S. Cl. .................. 370/223; 370/258; 370/238
(58) Field of Classification Search .................. 370/216, 370/218, 221, 222, 223, 224, 252–254, 258, 370/256, 392, 351, 389, 395.31, 404, 400, 370/405, 406
See application file for complete search history.

(56) References Cited

U.S. PATENT DOCUMENTS

| | | | |
|---|---|---|---|
| 5,923,675 A | 7/1999 | Brown et al. | |
| 6,549,513 B1 * | 4/2003 | Chao et al. | 370/227 |
| 7,599,315 B2 * | 10/2009 | Cornet et al. | 370/258 |
| 7,688,716 B2 * | 3/2010 | Pande et al. | 370/222 |
| 2006/0215544 A1 | 9/2006 | Asa et al. | 370/216 |
| 2007/0237072 A1 * | 10/2007 | Scholl | 370/222 |
| 2009/0262643 A1 * | 10/2009 | Zhao et al. | 370/217 |

FOREIGN PATENT DOCUMENTS

| | | |
|---|---|---|
| CN | 101102268 A | 1/2008 |
| DE | 102 60 640 | 7/2004 |
| DE | 102 60 640 A1 | 7/2004 |
| JP | 4-8041 T | 8/2001 |
| JP | 2001-251330 A | 3/2003 |
| JP | 2005-027039 A | 1/2005 |
| WO | WO 02/073903 | 9/2002 |
| WO | WO-02/073903 A1 | 9/2002 |

OTHER PUBLICATIONS

European Search Report for Application No. 09251184, dated Jul. 16, 2009.
Examination Report for European Application No. 09251184.9, dated Mar. 8, 2011.
Extended European Search Report for Application No. 09251184.9, dated Jul. 23, 2009.
Notice of Reasons for Rejection for Japanese Application No. 2009-122175, dated Dec. 21, 2010.

* cited by examiner

*Primary Examiner* — Hanh Nguyen
(74) *Attorney, Agent, or Firm* — Marshall, Gerstein & Borun LLP

(57) ABSTRACT

The present invention discloses a method for routing in a ring network, the ring network comprising multiple connected nodes, wherein, the method includes: each node in the ring network acquiring topology information of the ring network, obtaining under-ring routings learnt by the other nodes from a under-ring network, calculating a main path and a backup path to each routing according to the acquired topology information of the ring network, creating an FRR switch table, and switching between the main path and the backup path according to the FRR switch table when a failure occurs in the ring network. Accordingly, the present invention also provides a node in the ring network. Adopting technical scheme provided by the present invention, a simple routing implementation for ring network and fast convergence when a failure occurs can be provided.

20 Claims, 2 Drawing Sheets

RING NETWORK ROUTING METHOD AND RING NETWORK NODE

CROSS-REFERENCE TO RELATED APPLICATION

This application claims the priority benefit of Chinese Patent Application No. 200810111983.0, filed May 20, 2008, the entire disclosure of which is incorporated herein by reference.

FIELD OF THE TECHNOLOGY

The present invention relates to ring network technologies, and particularly to a routing method and node in a ring network.

BACKGROUND OF THE INVENTION

A ring network includes several nodes that are connected in series in a ring form, with advantages of fast protection switch, good failure self-recovery abilities and etc., and is widely applied in network structures of many industries like finance, education and etc. After the ring network is constructed, in order to guarantee normal forwarding of messages, it is needed to run a routing protocol among nodes in the network, so that the nodes can learn routing information for instructing the forwarding.

SUMMARY

Embodiments of the present invention is to provide a ring network routing method and ring network node, so as to provide a simple way of routing implementation for a ring network and implement fast convergence upon a failure occurs on a link of the ring network.

The embodiments of the present invention provide technical schemes as follows:

A routing method for a ring network including multiple connected nodes, includes: by each node in the ring network, acquiring topology information of the ring network, obtaining under-ring routings learnt by the other nodes from a under-ring network, calculating a main path and a backup path from the node to each under-ring routing according to the acquired topology information of the ring network, creating a Fast Rerouting (FRR) switch table, and switching between the main path and the backup path according to the FRR switch table when a failure occurs in the ring network.

A node in a ring network including multiple connected nodes, includes: a routing information acquiring module, a Fast Rerouting (FRR) generating module, a routing switch module and a control unit adapted for controlling each module, wherein, the topology information acquiring module is adapted for obtaining topology information of the ring network; the routing information acquiring module is adapted for acquiring under-ring routings learnt by the other nodes from a under-ring network; the FRR generating module is adapted for calculating the main path and backup path from the node to each under-ring routing according to the topology information of the ring network provided by the topology information acquiring module and the under-ring routings provided by the routing information acquiring module, and is further adapted for creating an FRR switch table; and the routing switch module is adapted for switching between the main path and the backup path according to the FRR switch table provided by the FRR generating module when a failure occurs in the ring network.

Computer-readable medium embodying means for implementing a routing method for a ring network including multiple connected nodes, wherein, the method includes: by each node in the ring network, acquiring topology information of the ring network, obtaining under-ring routings learnt by the other nodes from a under-ring network, calculating a main path and a backup path from the node to each under-ring routing according to the acquired topology information of the ring network, creating a Fast Rerouting (FRR) switch table, and switching between the main path and the backup path according to the FRR switch table when a failure occurs in the ring network.

DETAILED DESCRIPTION OF EMBODIMENTS

Inventor of the present invention finds that, there is no routing protocol specially for the ring network in the prior art yet, and various routing protocols in the prior art, like Open Shortest Path First (OSPF), Routing Information Protocol (RIP), Intermediate System-Intermediate System (ISIS) communication protocol and etc., are all generic routing protocols, which are applicable in various kinds of network architecture environment, but not specially provided for the ring network. If these generic routing protocols are applied in the ring network, it is not only quite complicated to implement but also impossible to implement fast convergence upon a failure occurs on a link of the ring network.

The embodiments of the present invention provide a technical scheme, including: providing a simple way of routing implementation combining particularities of ring network topology, calculating according to the ring network topology to get a Fast Rerouting (FRR) switch table, and rapidly performing routing switch according to the FRR switch table when a failure occurs on the ring network. Herein, the failure may occur on a node or a link.

To make the present invention's object, technical scheme and advantages clearer to understand, the embodiments of the present invention will be further described in detail hereinafter with reference to the drawings.

Figure 1:
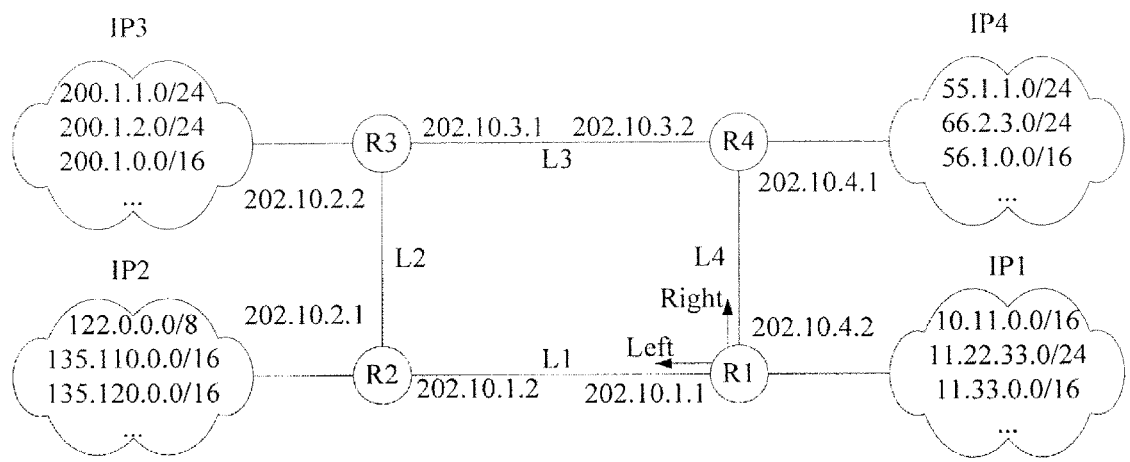
FIG. 1 is a diagram illustrating the structure of a ring network in accordance with an embodiment of the present invention.

With reference to the ring network structure shown in FIG. 1, nodes R1, R2, R3 and R4 are connected in series to form a ring, and the links connecting these nodes include L1, L2, L3 and L4, and nodes R1, R2, R3 and R4 are respectively connected to their own Internet Protocol (IP) networks IP1, IP2, IP3 and IP4.

For the convenience of subsequent description, several concepts are first specified as follows:

1) Node: each router on a ring is a node, each node has two connections, and each connection has an IP address.

2) Node Identity (ID): each node on a ring has a unique identity for identifying the node exclusively. In FIG. 1, identities of the nodes on the ring are R1, R2, R3 and R4 respectively, and these identities can be denoted by IP addresses of the nodes.

3) Connection: links between the nodes on a ring are called connections, the number of the connections is equal to the number of the nodes in a ring network, and each node corresponds to two connections, which are called left-hand connection and right-hand connection. As shown in FIG. 1, there are four connections altogether: L1, L2, L3 and L4, wherein, L1 is the left-hand connection of R1 as well as the right-hand connection of R2. IP addresses of two nodes being the two ends of a connection are usually in the same network segment, for instance, IP addresses of L1's two ends are 202.10.1.1 and 202.10.1.2 respectively.

4) Master: there is only one Master node in a ring simultaneously, and all the other nodes are called Slave.

The ring network routing method provided by the embodiments of the present invention mainly includes the following procedures:

1. A topology construction procedure, for notifying each node on the ring of the whole ring network's topology;

2. A routing advertising procedure, for spreading under-ring routing of each node on the ring;

3. A FRR generation procedure, for computing FRR protection paths, i.e., computing main paths and back-up paths for each node in the ring and generate an FRR switch table;

4. A failure switch procedure, for detecting a failure of a link or a node, and rapidly spreading the failure to the whole ring, so that each node on the ring can switch routing according to the FRR switch table;

5. A failure recovery procedure, for recovering the switched routing after the failure is recovered.

There are multiple methods for implementing the above-mentioned procedures, while one or several of them are mentioned here. Specific introduction is as follows:

1. The Topology Construction Procedure

The topology construction procedure is to notify each node on a ring of the information of the whole ring, including the identity and location of each node on the ring.

One method is that: a ring discovery message is sent from a Master node on a ring, after receiving the ring discovery message, each Slave node on the way of the message adds its own information to the received message, and the ring discovery message is returned to the Master node at last; and thus, the Master node gets to know the information of the entire ring and then sends out the information of the entire ring via a ring advertisement message, so that each Slave node on the way of the message gets to know the information of the entire ring.

With reference to FIG. 1, it is assumed that R1 is the Master node.

R1 sends a ring discovery message via its left-hand connection, the contents of which include {R1, 1, R1}, wherein, the first R1 denotes the sender namely the Master node, 1 denotes hop number, and the second R1 is the ID of the Master node. After receiving the ring discovery message sent by R1, R2 increases the hop number included the ring discovery message by one, adds R2's own ID to the ring discovery message, and then sends a modified ring discovery message including {R1, 2, R1, R2} to the next node R3. R3 and R4 modify the received ring discovery message in the same way as R2. Finally, the ring discovery message returns to R1 via the right-hand connection of R1, the contents of which have been modified as {R1, 4, R1, R2, R3, R4}, so that R1 gets to know that there are four nodes altogether on the ring, including R1, R2, R3 and R4 in series.

And then, R1 sends a ring advertisement message via its left-hand connection, the contents of which include {R1, 4, 1, R1, R2, R3, R4}, wherein, the first R1 denotes the sender namely the Master node, 4 denotes the number of the nodes on the ring, 1 denotes the hop number for indicating the number of the nodes the ring advertisement message having passed by, and R1, R2, R3 and R4 respectively denote each node on the ring in series. After receiving the ring advertisement message, R2 records the information (e.g., the contents) carried in the message, increases the hop number included in the message by one thereby the contents of the message being modified as {R1, 4, 2, R1, R2, R3, R4}, and then sends the modified ring advertisement message to the next node R3; R3 and R4 processes the received ring advertisement message in the same way as R2. And thus, the ring advertisement message finally returned to R1 includes contents of {R1, 4, 4, R1, R2, R3, R4}. After such a procedure, all the nodes on the ring get to know the ring network topology information shown in FIG. 1.

It can be seen from the above description that, because of the ring network's loop characteristic, the Master node can acquire topology information of the entire ring network by sending a ring discovery message in uni-direction, which is very simple and convenient to implement. And furthermore, after acquiring the topology information of the ring network, the Master node may spread the topology information of the entire ring network to each Slave node rapidly by sending a ring advertisement message in uni-direction so that all the nodes on the ring may obtain topology information of the entire ring network conveniently.

In addition, in order to discover changes of a network topology in time, the Master node periodically sends out the ring advertisement message, and each node on the ring checks network conditions according to the received ring advertisement message, if a node detects that the node information carried in the received ring advertisement message does not contain its own ID due to the changes of the network topology (e.g., a node's ID is changed or a new node is added to the ring), the node adds an update marker to the received ring advertisement message before forwarding it. And the Master node initiates a ring discovery message to perform ring discovery again after receiving the ring advertisement message carrying the update marker, until the topology of the ring network becomes stable. For instance, in FIG. 1, assuming that the ID of R3 is changed into R3*, after receiving the ring advertisement message sent by Master node R1, R3 modifies the contents of the received ring advertisement message as {R1, 4, 3, R1, R2, R3, R4, Flag=update}, and then sends the modified message to R4. The modified message is returned to Master node R1 via R4, and R1 perform the ring discovery again after receiving the message carrying update marker until the topology is stable.

Another method for implementing topology construction is that: each node on the ring, no matter whether it is Master node or Slave node, periodically sends a ring advertisement message carrying its ID and hop number respectively via its left-hand connection and right-hand connection, and after receiving a ring advertisement message from another node on the ring, increases the hop number in the received ring advertisement message by one, and forwarding the ring advertisement message with the hop number being increased to the next node, where, the ring advertisement message is finally returned to its originating node. And then, each node may determine the topology of the ring network according to the information carried in the received ring advertisement messages from other nodes.

An embodiment will be illustrated with reference to FIG. 1.

Taking R2 for example, R2 sends a ring advertisement message containing {R2, 1} via its right-hand connection. When R1 receives such a ring advertisement message via its left-hand connection, R1 increases the hop number in the received ring advertisement message, thereby the ring advertisement message's contents being modified as {R2, 2}, and then forwards the ring advertisement message containing {R2, 2} via its right-hand connection. R4 and R3 process the received ring advertisement message in the same way as R1. At last, the ring advertisement message returns to R2 from R3 with the contents being modified as {R2, 4}. After receiving the ring advertisement message via its left-hand connection, R2 directly discards the received ring advertisement message without forwarding it. In addition, R2 may also send a ring advertisement message containing {R2, 1} via its left-hand connection, and the ring advertisement message will be transmitted on the ring in the above-mentioned way except that it is transmitted in a reverse direction. And if any other node on the ring sends a ring advertisement message, it will send the ring advertisement message in the same way as R2, which will not be described in detail hereby.

Any node on the ring may construct an entire ring network topology according the information carried in the ring advertisement messages received from other nodes. For instance, taking R3 for example, R3 receives a message containing {R2, 1} via its right-hand connection and receives a message containing {R2, 3} via its left-hand connection, so that R3 gets to know that there are four (i.e., 1 plus 3) hops altogether on the ring, namely there are four nodes on the ring, and that R2 is one hop away on the right-hand direction and three hops away on the left-hand direction from R3. Moreover, R3 receives a message containing {R1, 2} via its right-hand connection and receives a message containing {R1, 2} via its left-hand connection, so that R3 gets to know that there are four (i.e., 2 plus 2) hops altogether on the ring, and that R1 is two hops away on the right-hand direction and two hops away on the left-hand direction from R3. Besides, R3 receives a message containing {R4, 1} via its right-hand connection and receives a message containing {R4, 3} via its left-hand connection, so that R3 gets to know that there are four (i.e., 3 plus 1) hops altogether on the ring, and that R4 is three hops away on the right-hand direction and one hop away on the left-hand direction from R3. Finally, a table of the ring node's hop number as shown in Table 1 is generated in R3.

TABLE 1

| Ring nodes | Left-hand hops | Right-hand hops |
|---|---|---|
| R1 | 2 | 2 |
| R2 | 3 | 1 |
| R3 | 0 | 0 |
| R4 | 1 | 3 |

2. The Routing Advertising Procedure

After the information of the ring network topology is acquired, the routing advertising procedure is started.

The routing publication procedure includes: each node on the ring advertising the under-ring routing information self-obtained from a under-ring network to the other nodes on the ring, so that every node on the ring can obtain the entire routing information, where the under-ring routing information may be the routing information obtained from other routing protocols running on a under-ring interface.

A method of implementation the routing advertising procedure is that, each node on the ring sends its own routing advertisement message. For example, in FIG. 1, R2 sends a routing advertisement message via its left-hand connection, the content carried in which includes {R2, IP2}. Wherein, R2 denotes the sender, which means that the following routings are advertised by R2; and IP2 denotes a set of all routing information learnt by R2 from a under-ring path, which is saved in a form of IP/Mask, and the set of routing information may be expressed as a list of 122.0.0.0/8, 135.110.0.0/16, 135.120.0.0/16, . . . when the network is as shown in FIG. 1. If there are so much routing information that one message can not carry all, more than one routing advertisement message may be used to carry the routing information. After receiving the routing advertisement message sent by R2, R3 records the routing information advertised by R2, i.e., the routing information carried in the received routing advertisement message, and then sends the routing advertisement message to the next node R4. R4 processes the received routing advertisement message as R3 does. At last, the routing advertisement message originated from R2 returns to R2 via R3, R4 and R1 in series, so that R2 gets to know that its own routing information has been successfully advertised to the other nodes on the ring. Likewise, R1, R3 and R4 may also advertise their own routing information as R2 does, so that all the nodes on the ring can learn the routing information of the other nodes conveniently.

When the network structure is as shown in FIG. 1, each node on the ring can stored all the acquired routing information in a form of a basic routing information table as shown in Table 2,

TABLE 2

| ID | IP/Mask |
|---|---|
| R1 | 10.11.0.0/16 |
|  | 11.22.33.0/24 |
|  | 11.33.0.0/16 |
|  | . . . |
| R2 | 122.0.0.0/8 |
|  | 135.110.0.0/16 |
|  | 135.120.0.0/16 |
|  | . . . |
| R3 | 200.1.1.0/24 |
|  | 200.1.2.0/24 |
|  | 200.1.0.0/16 |
|  | . . . |
| R4 | 55.1.1.0/24 |
|  | 66.2.3.0/24 |
|  | 56.1.0.0/16 |
|  | . . . |

In the above Table 2, R1~R4 in the first column denote the indirect next hop of the corresponding routings in the second column. For instance, when R2 receives a message whose destination is 55.1.1.1, it can be known according to the above table that, this message is to be sent to R4 first because this message's corresponding routing is advertised by R4.

The above-mentioned information constitutes an entire basic routing information table, which settles basis for subsequent FRR generation and routing fast switch.

3. The FRR Generation Procedure

With the above-mentioned entire basic routing information table, it is applicable to generate a final FRR switch table according to a rule, so as to reach the object of fast switch upon a failure occurs.

Due to the characteristic of the ring network, there are actually two paths from one node to another node on the ring, thus it becomes a problem to solve as how to select a path. One method is that, each node on the ring respectively calculates the hop number of the left-hand connection to the destination network and that of the right-hand connection to the destination network, and selects the one with fewer hops as a main path to the destination network, and the other one is regarded as a backup path. After receiving a message, the node preferably selects the main path to forward the message, and switches to the backup path upon a failure occurs on the main path.

With reference to FIG. 1, taking R2 for example, on the assumption that IP1 is the destination, R2 calculates the hop number of the left-hand connection to IP1 and that of the right-hand connection to IP1 via respectively, and gets the hop numbers of the two paths are 3 and 1 respectively. Obviously, the path of the right-hand connection is of fewer hops, so R2 takes the right-hand connection L1 as the main path to IP1, and the left-hand connection L2 as the backup path to IP1. The main path and backup path from R2 to IP3 and those from R2 to IP4 are determined in the same way as those from R2 to IP1 are determined, if the hop number of the left-hand connection is equal to that of the right-hand connection, one of the two connections is selected as the main path according to a predefined rule (e.g., the left-hand connection is of higher priority), while the other connection is the backup path. For instance, in FIG. 1, hop number of the left-hand connection of R2 to IP4 and that of the right-hand connection of R2 to IP4 are both 2, if the left-hand connection is of higher priority, R2 selects the left-hand connection L2 as the main path and the right-hand connection L1 is the backup path.

R2 may save the calculated main path and backup path in a form of a next hop backup relation table shown in Table 3. As to the routing IP2, the routing "122.0.0.0/8 135.110.0.0/16 135.120.0.0/16 . . . " in Table 3, learned from a under-ring path, R2 keeps the original routing information invariable, and there is only a local link but no backup path corresponding to IP2.

TABLE 3

| Routing | Indirect next hop | Main path | Backup path |
| --- | --- | --- | --- |
| 10.11.0.0/16<br>11.22.33.0/24<br>11.33.0.0/16<br>. . . | [R1] | L1 | L2 |
| 122.0.0.0/8<br>135.110.0.0/16<br>135.120.0.0/16<br>. . . | [R2] | Local link | — |
| 200.1.1.0/24<br>200.1.2.0/24<br>200.1.0.0/16<br>. . . | [R3] | L2 | L1 |
| 55.1.1.0/24<br>66.2.3.0/24<br>56.1.0.0/16<br>. . . | [R4] | L2 | L1 |

It can be seen from Table 3 that, when routings introduced from an external network are relatively stable, Table 3 is kept invariable. Routings advertised by the same node correspond to the same indirect next hop, main path and backup path. When a failure occurs on a link on a ring, the indirect next hop of a node is unchanged, so it is only needed to decide which path is to be selected considering the current path conditions, in another word, it is only needed to switch between the main path and the backup path according to Table 2 when a failure occurs on the link, thereby the switch speed is high. For the convenience of illustration, indirect next hops are identified as [R1], [R2], [R3] and [R4] in Table 3. In a network with N nodes, there are N indirect next hops for one of the nodes, and one of the indirect next hops is a local next hop denoting an under-ring path.

For instance, taking R2 in Table 4 for example, Table 4 shows an FRR switch table at R2 when a failure occurs on any of the links L1~L4. Referring to Table 3, since the main path from R2 to [R1] is L1, switch between the main path and the backup path is needed when a failure occurs on L1, and the main path to [R1] is switched to L2; and the main path from R2 to [R3] is L2, when a failure occurs on L2, R2 needs to switch the main path to [R3] to L1; and, the main path from R2 to [R4] contains L2 and L3, and R2 needs to switch the main path to [R4] to L1 when a failure occurs on L2 or L3. After the above-mentioned switch, all messages will not be passed on the link at failure, and connectivity of the network is guaranteed.

TABLE 4

| Link at failure | [R1] | [R2] | [R3] | [R4] |
| --- | --- | --- | --- | --- |
| L1 | L1->L2 main-backup switch | No switch | No switch | No switch |
| L2 | No switch | No switch | L2->L1 main-backup switch | L2->L1 main-backup switch |
| L3 | No switch | No switch | No switch | L2->L1 main-backup switch |
| L4 | No switch | No switch | No switch | No switch |

Processes of the other nodes on the ring are the same as that of R2, which are not to be illustrated hereinafter.

4. The Failure Switch Procedure

In order to guarantee normal operations of a ring network, each node on a ring checks the state of each link connected thereto in real time, if a node finds that a failure has occurred on a connected link at one side, the node will send a failure announce message via a normal link at the other side in the reverse direction in order to notify the other nodes of the failure being occurred on a link in the ring.

For instance, in FIG. 1, if R2 finds that a failure occurs on L2, R2 sends a failure announce message through L1, the content carried in which includes (R2, R3), indicating that R2 finds a failure on a link from R2 to R3, namely L2. And then, according to the switch relation shown in Table 4, the path to the indirect next hop [R3] is switched by R2 from L2 to L1, and the path to the indirect next hop [R4] is switched by R2 from L2 to L1.

After receiving the failure announce message, R1 forwards the message to the next node R4 and finishes FRR switch also according to its own FRR switch table similar to Table 4. R4 processes the received failure announce message the same as R1 does, and the failure announce message will be transmitted to R3 finally. Likewise, when L2 is at failure, R3 can also detect it, and similar to what R2 does, R3 sends a failure announce message through the normal link L3, the content carried in which includes (R3, R2), and the failure announce message sent by R3 finally reaches R2 via R4 and R1.

In addition, in the topology construction procedure, if nodes on the ring acquire the ring network topology by sending the ring advertisement message in bi-direction, the nodes can confirm if a link is at failure according to the receiving condition of the ring advertisement message, and may not send a failure announce message when a failure occurs on a link in the ring network. Because once a link is broken, all the nodes on the ring can receive the ring advertisement message in the same direction from the same node, and by comparing each node's receiving condition of the ring advertisement message, each node gets to know which link is at failure. Taking FIG. 1 for example, supposing that L2 is at failure, R1 finds that the ring advertisement message from R2 can be received only via the left-hand connection and the ring advertisement messages from R3 and R4 can be received only via the right-hand connection, and considering the topology of the ring network, R1 confirms that link L2 between R2 and R3 is at failure.

5. The Failure Recovery Procedure

After a failure on a link of the ring network is recovered, each node on the ring may switch back to the previous routing, i.e., the routing being used before the failure occurs. Thereby, the following ways can be applied to judge whether a failure on a link is recovered:

1. The main node periodically sends a ring advertisement message from one side (i.e., the left-hand connection or the right-hand connection), and it's impossible for the main node to receive the ring advertisement message self-originated from the other side when a link is at failure. The main node can receive the self-originated ring advertisement message from the other side once the failure is recovered, and then, the main node sends out a link recovery message to notify other nodes on the ring that the link has been recovered. After learning that the link has been recovered, each node on the ring recovers the previous routing, i.e., the routing being used before the failure occurs, and the network comes back to the normal state.

2. Each node on the ring real-timely checks the state of each link connected, and sends a failure recovery message to the other nodes on the ring upon detecting that a previously broken link is recovered, to notify that the previously broken link has returned to the normal state.

3. During the topology construction procedure, if each node on the ring acquires the ring network topology by sending a ring advertisement message in bi-direction, the following may be adopted for the failure recovery: since each node on the ring periodically sends the ring advertisement message via both the left-hand and right-hand connections, any node on the ring may determine whether a failure on a link in the ring network is recovered by judging whether the ring advertisement message of the same node is received via both the left-hand and right-hand connections, and if the ring advertisement message of one node is received via both the left-hand and right-hand connections, it determines that the failure on the link in the ring network has been recovered and switches to the previous routing from which the node switches to the current routing when the failure occurs.

It can bee seen from the above description that, when a failure occurs in the ring network, the switch time is mainly depending on failure detection time, failure spread time and FRR switch time. In practical applications, the failure detection time may be limited to a millisecond level since failure detection is usually performed by hardware; the failure spread time may be less than $K1*N/2$ as it lies on message forwarding and the size of the ring, where, $K1$ denotes per-hop spread time in the millisecond level and N denotes the number of the nodes in the ring; and the FRR switch time may be less than $K2*(N/2+1)$ because the times of FRR main-backup switch is no more than $(N/2+1)$ when a failure occurs, where, $K2$ denotes the time per FRR entry switch, which is also in the millisecond level. Therefore, the switch time upon a failure occurs in the network can be limited to the millisecond level, usually within 50 ms. To sum up, the routing method provided by the present invention's embodiments not only is easy and convenient to implement, but also realizes fast converging when a failure occurs on the ring.

Figure 2:
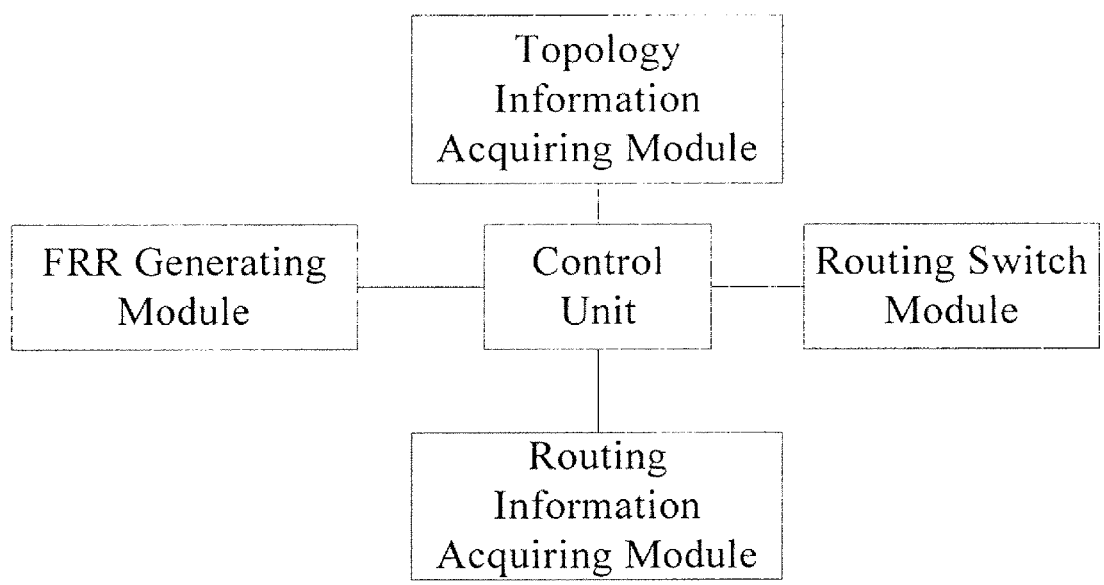
FIG. 2 is a diagram illustrating the structure of a ring network node in accordance with embodiment of the present invention.

Accordingly, the embodiments of the present invention also provide a ring network node, which is located in a ring network including multiple connected nodes, and an exemplary structure of the ring network node is as shown in FIG. 2. The ring network node includes: a topology information acquiring module, a routing information acquiring module, an FRR generating module, a routing switch module and a control unit for controlling the above module.

The topology information acquiring module is adapted to obtain topology information of the ring network.

The routing information acquiring module is adapted to acquire under-ring routings learnt by the other nodes from an under-ring network.

The FRR generating module is adapted to calculate the main path and backup path from the node to each under-ring routing according to the topology information of the ring network provided by the topology information acquiring module and the under-ring routings provided by the routing information acquiring module, and is further adapted to create a Fast Rerouting (FRR) switch table.

The routing switch module is adapted to perform a main-backup path switch (i.e., switch between the main path and backup path) according to the FRR switch table generated by the FRR generating module when a failure occurs in the ring network.

In the above ring network node, the FRR generating module may include: a main-backup path generating module and an FRR switch table generating module. The main-backup path generating module is adapted to, for each under-ring routing, calculate the hop number of the left-hand connection to the indirect next hop (i.e., the node) corresponding to the under-ring routing and that of the right-hand connection to the indirect next hop corresponding to the under-ring routing, and selects, from the left-hand connection and right-hand connection, the one of a less hop number as the main path to the under-ring routing and the other one as the backup path, and selects one of the left-hand connection and right-hand connection as the main path according to a predefined rule if the hop numbers thereof are equal and the other one as the backup path. The FRR switch table generating module is adapted to, for each link in the ring, judge respectively whether the link is included in a main path of the node heading to an indirect next hop, and make a sign in the FRR switch table indicating that the main-backup path switch is to be performed when a failure occurs on the link if the link is included in the main path and make a sign in the FRR switch table indicating that no switch is to be performed otherwise.

In the above ring network node, the routing switch module is further adapted to recover the path from which the node switches to the current path in the main-backup path switch when the link in the ring network returns to the normal state.

It can be seen that, combining the characteristic of the ring network topology, the embodiments of the present invention provide a simple and efficient way of routing implementation. Moreover, when a failure occurs on a link of the ring network, fast convergence can be realized, by adopting technical scheme provided by the embodiments of the present invention, so as to limit switch time to a millisecond level.

The foregoing is only embodiments of the present invention. The protection scope of the present invention, however, is not limited to the above description. Any change or substitution, easily occurring to those skilled in the art, should be covered by the protection scope of the present invention.

What is claimed is:

1. A routing method for a ring network, the ring network comprising multiple connected nodes, the method comprises:
   by each node in the ring network, acquiring topology information of the ring network, obtaining under-ring routings learned by the other nodes from an under-ring network, calculating a main path and a backup path from the node to each under-ring routing according to the acquired topology information of the ring network,
   wherein, for each under-rinq routing, calculating the hop number of the left-hand connection to the node corresponding to the under-ring routing and the hop number of the right-hand connection to the node corresponding to the under-ring routing, selecting the one of the left-hand connection or the right-hand connection having the smaller hop number as the main path to the under-ring routing and the other as the backup path to the under-ring routing if the two calculated hop numbers are not equal, and otherwise, selecting one of the left-hand connection and the right-hand connection as the main path according to a predefined rule and the other one as the backup path if the two calculated hop numbers are equal, creating a Fast Rerouting (FRR) switch table, and switching between the main path and the backup path according to the FRR switch table when a failure occurs in the ring network.

2. The method according to claim 1, wherein, the acquiring the topology information of the ring network, comprises:
by a Master node of the ring network, sending a ring discovery message via a connection;
by each Slave node of the ring network, adding node information of the Slave node to the ring discovery message after receiving the ring discovery message and forwarding the ring discovery message with the node information being added to a link different from a link from which the ring discovery message is received; and
by the Master node, determining topology of the ring network according to the information in the ring discovery message received from the other connection, and transmitting the topology information of the ring network to each node in the ring network via a ring advertisement message.

3. The method according to claim 2, wherein, the ring discovery message carries a sender identity, hop number and information of each node that the ring discovery. message passes by.

4. The method according to claim 2, wherein, the transmitting the topology information of the ring network to each node in the ring network via the ring advertisement message, comprises:
by the Master node, sending a ring advertisement message via a connection, the ring advertisement message carrying an identity of the master node, a total hop number, a second hop number and information of all nodes in the ring network; and
by each Slave node, recording, after receiving the ring advertisement message, the information carried in the received ring advertisement message, increasing the second hop number carried in the received ring advertisement message by one, and sending to the next node the ring advertisement message with the second hop number being increased.

5. The method according to claim 2, further comprising:
by the Master node, sending a ring advertisement message periodically;
by each Slave node, adding, after receiving the ring advertisement message, an update marker to the received ring advertisement message if it judged that information of the Slave node is not included in node information carried in the ring advertisement message, and sending to the next node the ring advertisement message with the update marker being added; and
by the Master node, sending a ring discovery message again if receiving a ring advertisement message carrying the update marker to reacquire the new topology of the network.

6. The method according to claim 1, wherein, the acquiring the topology information of the ring network, comprises:
by each node in the ring network, sending a ring advertisement message carrying its own identity and a hop number bi-directionally, wherein, each ring advertisement message is processed by each node receiving it by increasing the hop number in the received ring advertisement message by one, and sending to the next node the ring advertisement message with the hop number being increased; and
by each node in the ring network, determining topology of the ring network according to the information carried in each ring advertisement message received.

7. The method according to claim 6, wherein, each node in the ring network determines whether a failure occurs on a link in the ring network according to the receiving of the ring advertisement message, wherein, it is determined that a failure occurs on a link in the ring network if the ring advertisement message of the same node is received uni-directionally.

8. The method according to claim 6, further comprising:
by each node in the network, determining whether a ring advertisement message of the same node is received bi-directionally, and determining that the link previously at failure is recovered if it is determined that the ring advertisement message of the same node is received bi-directionally.

9. The method according to claim 1, wherein, the obtaining the under-ring routing learned by the other nodes from the under-ring network, comprises:
by each node in the ring network, sending a routing advertisement message via a connection, the routing advertisement message carrying the identity of the node and the under-ring routing learnt by the node from a under-ring network; wherein, each routing advertisement message is processed by each node receiving it by recording the under-ring routing carried in the received routing advertisement message, and forwarding the received routing advertisement message to the next node.

10. The method according to claim 1, wherein, the creating the FRR switch table, comprises:
by each node in the ring network, judging, for each link in the ring network, whether the link is comprised in a main path of the node heading to the node corresponding to an under-ring routing, indicating in the FRR switch table that switch between the main path and the backup path is to be performed when a failure occurs on the link if it is judged that the link is comprised in the main path, and otherwise, indicating in the FRR switch table that no switch is to be performed if it is judged that the link is not comprised in the main path.

11. The method according to claim 1, further comprising:
by each node in the ring network, detecting the state of the links connected to the node in real time, and when detecting a failure on one link, sending a failure announce message via the other link to notify the other nodes that there is a link at failure in the ring network; and
by each node being notified that there is a link at failure in the ring network, switching between the main path and the backup path according to the FRR switch table.

12. The method according to claim 1, further comprising:
by a Master node of the ring network, sending a ring advertisement message via a connection periodically, and sending a link recovery message to notify the other nodes in the ring network that a link previously at failure is recovered when a ring advertisement message originally sent by the Master node is received via the other connection.

13. The method according to claim 1, further comprising:
by each node in the ring network, detecting the state of the links connected to the node in real time, and when detecting that a link previously at failure is recovered, sending a failure recovery message to notify the other nodes that the link is recovered.

14. The method according to claim 1, further comprising:
by each node in the ring network, switching back to the path previously used by the node when the link previously at failure is recovered.

15. The method according to claim 1, further comprising:
generating a relation table which associates each under-ring routing with an indirect next hop, the main path and the backup path,
wherein the FRR switch table records a route for each link and for each indirect next hop to which a route from the node to the indirect next hop can be switched when a failure occurs on the link.

16. A node in a ring network, the ring network comprising multiple connected nodes, the node comprising:
a routing information acquiring module, a Fast Rerouting (FRR) generating module, a routing switch module and a control unit for controlling each module,
wherein the topology information acquiring module is for obtaining topology information of the ring network,
wherein the routing information acquiring module is for acquiring under-ring routings learnt by the other nodes from a under-ring network,
wherein the FRR generating module is for calculating the main path and backup path from the node to each under-ring routing according to the topology information of the ring network provided by the topology information acquiring module and the under-ring routings provided by the routing information acquiring module, and the FRR generating module is further for creating an FRR switch table, and
wherein the routing switch module is for switching between the main path and the backup path according to the FRR switch table provided by the FRR generating module when a failure occurs in the ring network,
the FRR generating module comprising
a main backup path generating module, for calculating the main path and the backup path for each under-ring routing corresponding to the other nodes, where, for one under-ring routing, calculating the hop number of the left-hand connection to the node corresponding to the under-ring routing and the hop number of the richt-hand connection to the node corresponding to the under-ring routing and, if the hop numbers are not equal, selecting the one of left-hand connection and the right-hand connection having the smaller hop number as the main path to the under-ring routing and the other as the backup path, and if the hop numbers are equal, selecting one of the left-hand connection and the right-hand connection as the main path according to a predefined rule and the other one as the backup path.

17. The node according to claim 16, wherein, the FRR generating module further comprises:
an FRR switch table generating module, for judging, for each link in the ring network, whether the link is comprised in a main path of the node heading to an indirect next hop, indicating in the FRR switch table that switch between the main path and the backup path is to be performed when a failure occurs on the link if it is judged that the link is comprised in the main path, and indicating in the FRR switch table that no switch is to be performed if it is judged that the link is not comprised in the main path.

18. The node according to claim 16, wherein, the routing switch module is further for recovering the path previously used by the node before the failure occurs when the link previously at failure is recovered.

19. The node according to claim 16, wherein the FRR generating module comprises:
an FRR switch table generating module, for generating a relation table which associates each under-ring routing with an indirect next hop, the main path and the backup path; and generating the FRR switch table which records a route for each link and for each indirect next hop to which a route from the node to the indirect next hop can be switched when a failure occurs on the link.

20. Computer-readable medium that provides instructions, which when executed on a processor in a node in a ring network cause the processor to perform a routing method comprising: acquiring topology information of the ring network, obtaining under-ring routings learnt by the other nodes from a under-ring network, calculating a main path and a backup path from the node to each under-ring routing according to the acquired topology information of the ring network, wherein, for each under-ring routing, calculating the hop number of the left-hand connection to the node corresponding to the under-ring routing and the hop number of the right-hand connection to the node corresponding to the under-ring routing, selecting the one of the left-hand connection and the right-hand connection having the smaller hop number as the main path to the under-ring routing and the other one as the backup path to the under-ring routing if the two calculated hop numbers are not equal, and otherwise, selecting the one of the left-hand connection and the right-hand connection as the main path according to a predefined rule and the other one as the backup path if the two calculated hop numbers are equal, creating a Fast Rerouting (FRR) switch table, and switching between the main path and the backup path according to the FRR switch table when a failure occurs in the ring network.

* * * * *